US009561786B2

(12) United States Patent
Shand et al.

(10) Patent No.: US 9,561,786 B2
(45) Date of Patent: Feb. 7, 2017

(54) SYSTEM AND METHOD FOR BRAKE PEDAL FEEL CONTROL (71) Applicant: FORD GLOBAL TECHNOLOGIES, LLC, Dearborn, MI (US)

(72) Inventors: Mark Allen Shand, Brighton, MI (US); Daniel A. Gabor, Canton, MI (US)

(73) Assignee: FORD GLOBAL TECHNOLOGIES, LLC., Dearborn, MI (US)

( * ) Notice: Subject to any disclaimer, the term of this patent is extended or adjusted under 35 U.S.C. 154(b) by 0 days.

(21) Appl. No.: 14/514,591

(22) Filed: Oct. 15, 2014

(65) Prior Publication Data
US 2016/0107625 A1 Apr. 21, 2016

(51) Int. Cl.
| B60T 8/40 | (2006.01) |
| B60T 7/04 | (2006.01) |
| B60T 7/06 | (2006.01) |
| B60T 8/32 | (2006.01) |
| B60T 13/12 | (2006.01) |
| B60W 10/188 | (2012.01) |
| G05G 1/44 | (2008.04) |

(52) U.S. Cl.
CPC ............. B60T 8/4086 (2013.01); B60T 7/042 (2013.01); B60T 7/06 (2013.01); B60T 8/3255 (2013.01); B60T 8/3275 (2013.01); B60T 8/409 (2013.01); B60T 13/12 (2013.01); B60W 10/188 (2013.01); B60T 2220/04 (2013.01); B60W 2540/12 (2013.01); B60W 2550/12 (2013.01); B60W 2710/18 (2013.01); G05G 1/44 (2013.01); Y10T 74/20528 (2015.01)

(58) Field of Classification Search
CPC .......... B60T 8/4086; B60T 7/042; B60T 7/06; B60T 8/3275; B60T 13/12; B60W 10/188; B60W 2540/12; B60W 2550/12; B60W 2710/18; G05G 1/44; Y10T 74/20528
USPC .................. 701/22, 70, 78; 74/512; 303/155
See application file for complete search history.

(56) References Cited

U.S. PATENT DOCUMENTS

| 5,762,407 | A | * | 6/1998 | Stacey ..................... B60T 7/042 |
| | | | | 303/113.4 |
| 6,309,031 | B1 | | 10/2001 | Crombez et al. |
| 6,679,135 | B1 | | 1/2004 | Faigle et al. |
| 6,916,074 | B2 | | 7/2005 | Jung et al. |
| 7,032,496 | B2 | * | 4/2006 | Schramm .............. B60T 13/575 |
| | | | | 91/369.2 |
| 7,219,966 | B2 | | 5/2007 | Young |
| 7,357,465 | B2 | | 4/2008 | Young et al. |

(Continued)

FOREIGN PATENT DOCUMENTS

JP 2000280872 A 10/2000

OTHER PUBLICATIONS

Sang-Don Lee and Seunt-Lye Kim, "Characterization and development of the ideal pedal force, pedal travel, and response time in the brake system for the translation of the voice of the customer to engineering specifications", Proc. IMechE vol. 224 Part D: J. Automobile Engineering.

*Primary Examiner* — Russell Frejd
(74) *Attorney, Agent, or Firm* — Carlson, Gaskey & Olds, P.C.

(57) ABSTRACT

A method according to an exemplary aspect of the present disclosure includes, among other things, adjusting the feel of a brake pedal based on a comparison between a predetermined level of resistance to an input braking force and a measured input braking force.

20 Claims, 5 Drawing Sheets

(56) References Cited

U.S. PATENT DOCUMENTS

| | | | |
|---|---|---|---|
| 7,634,345 B2 * | 12/2009 | Karnjate | ................ B60T 7/042 303/155 |
| 7,748,792 B2 | 7/2010 | Crombez et al. | |
| 7,851,939 B2 | 12/2010 | Degoul et al. | |
| 8,076,874 B2 * | 12/2011 | Ueno | ....................... B60L 7/14 318/139 |
| 2002/0074196 A1 | 6/2002 | Park | |
| 2002/0108463 A1 | 8/2002 | Shaw | |
| 2008/0243323 A1 * | 10/2008 | Karnjate | ................ B60T 7/042 701/22 |
| 2014/0136069 A1 | 5/2014 | Jung et al. | |

\* cited by examiner

SYSTEM AND METHOD FOR BRAKE PEDAL FEEL CONTROL

BACKGROUND

This disclosure relates to a system and method for brake pedal feel control.

In non-hybrid electric vehicles, a brake pedal is connected to a hydraulic pressure booster. The booster provides resistance to a user's braking force, which is experienced by the user as "pedal feel."

In hybrid electric vehicles, the brake pedal is ordinarily not connected to a booster. In order to simulate brake pedal feel, one known brake pedal assembly includes a roller bearing that follows a cam surface. The contour of the cam surface dictates the level of resistance felt by the user during braking.

In another known brake pedal assembly for a hybrid electric vehicle, such as that described in U.S. 2002/0108463 to Shaw et al., a brake pedal is connected to a piston assembly including a magneto-rheological fluid. The viscosity of the magneto-rheological fluid is selectively adjustable in response to changes in a magnetic field. As the magnetic field changes, the viscosity of the magneto-rheological fluid changes, which results in changes in pedal resistance felt by the user.

SUMMARY

A method according to an exemplary aspect of the present disclosure includes, among other things, adjusting the feel of a brake pedal based on a comparison between a predetermined level of resistance to an input braking force and a measured input braking force.

In a further non-limiting embodiment of the foregoing method, the predetermined level of resistance is determined based on pedal travel.

In a further non-limiting embodiment of the foregoing method, a piston assembly including a magneto-rheological fluid is connected to the brake pedal, and a magnetic field generator is adjacent the piston assembly. The feel of the brake pedal is adjusted by changing the level of current applied to the magnetic field generator.

In a further non-limiting embodiment of the foregoing method, the feel of the brake pedal is adjusted in response to a pedal stab.

In a further non-limiting embodiment of the foregoing method, when a pedal stab occurs, the resistance of the brake pedal to the input braking force is increased.

In a further non-limiting embodiment of the foregoing method, the feel of the brake pedal is adjusted in response to an external condition.

In a further non-limiting embodiment of the foregoing method, the feel of the brake pedal is adjusted in response to a speed of a vehicle.

In a further non-limiting embodiment of the foregoing method, the brake pedal is associated with an electrified vehicle.

A system according to an exemplary aspect of the present disclosure includes, among other things, a brake pedal assembly including a brake pedal, and a controller configured to adjust a feel of the brake pedal based on a comparison between a predetermined level of resistance to an input braking force and a measured input braking force.

In a further non-limiting embodiment of the foregoing system, the controller is configured to determine the predetermined level of resistance based on pedal travel.

In a further non-limiting embodiment of the foregoing system, the brake pedal assembly includes a brake pedal arm pivotably connected to a body of a vehicle. The brake pedal is provided on a free end of the brake pedal arm.

In a further non-limiting embodiment of the foregoing system, a piston assembly is provided between a midpoint of the pedal arm and a body of a vehicle.

In a further non-limiting embodiment of the foregoing system, the piston assembly includes a housing containing a piston, and the housing is filled with a magneto-rheological fluid.

In a further non-limiting embodiment of the foregoing system, the brake pedal assembly includes a magnetic field generator in communication with the controller, and the controller configured to adjust the magnetic field generated by the magnetic field generator to adjust the viscosity of the magneto-rheological fluid.

In a further non-limiting embodiment of the foregoing system, the controller adjusts the feel of the brake pedal in response to a pedal stab.

In a further non-limiting embodiment of the foregoing system, the controller adjusts the feel of the brake pedal in response to a speed of a vehicle.

In a further non-limiting embodiment of the foregoing system, the controller adjusts the feel of the brake pedal in response to an outside temperature.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

This disclosure relates to a system and method for brake pedal feel control. In one example, the feel of a brake pedal is adjusted based on a comparison between (1) a predetermined level of resistance to an input braking force and (2) a measured input braking force.

Figure 1:
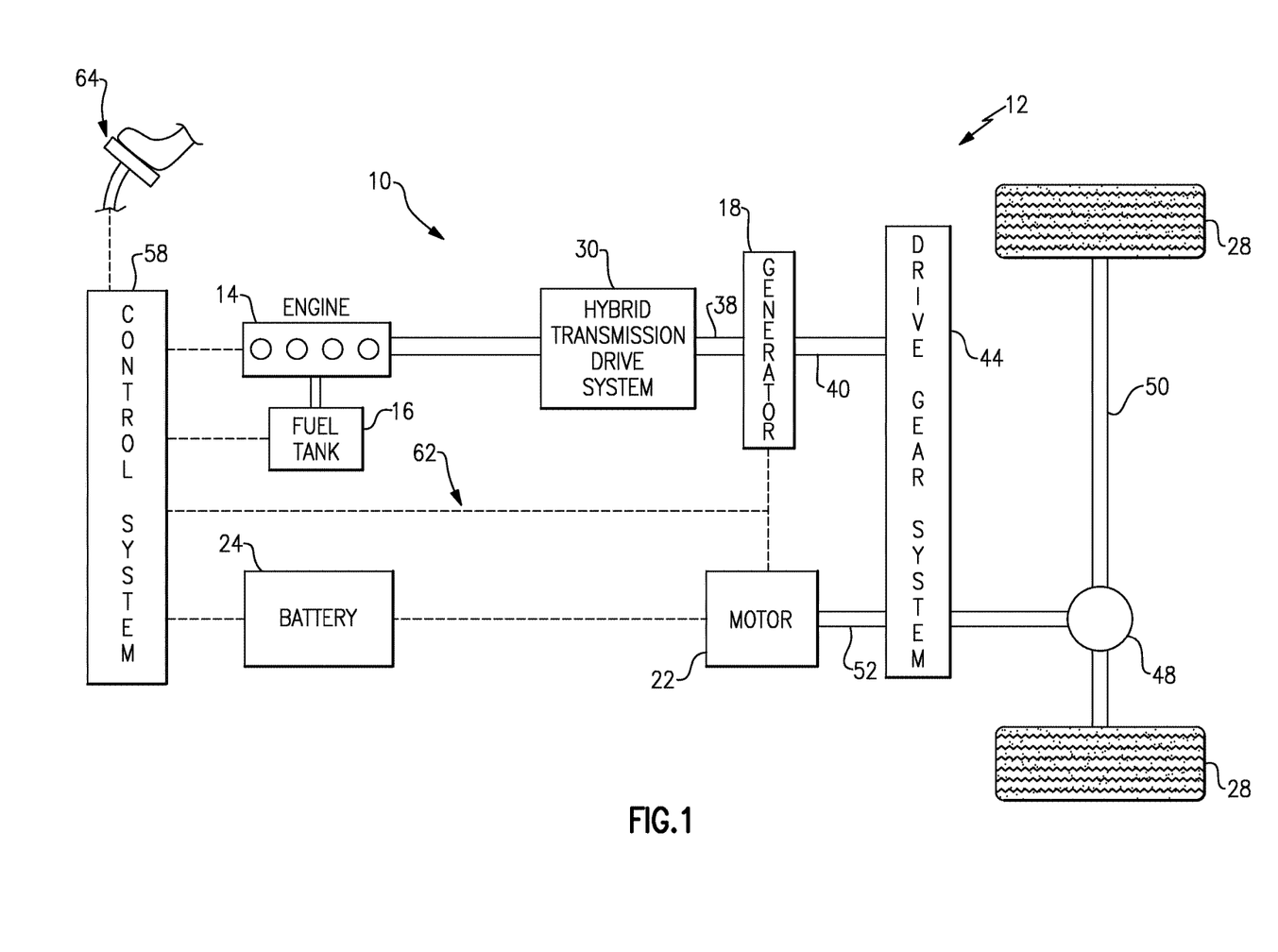
FIG. 1 schematically illustrates a powertrain of a vehicle.

FIG. 1 schematically illustrates a powertrain of a vehicle 12, which, in this example, is an electrified vehicle. Although depicted as a hybrid electric vehicle (HEV), it should be understood that the concepts described herein are not limited to HEVs and could extend to other vehicles, including, but not limited to, plug-in hybrid electric vehicles (PHEVs), battery electric vehicles (BEVs), and modular hybrid transmission vehicles. This disclosure also extends to stop-start vehicles, vehicles powered only by an internal combustion engine (ICE), hydrogen vehicles (including both internal combustion and fuel cell hydrogen vehicles), natural gas vehicles, and propane vehicles, among others.

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery 24. In this embodiment, the second drive system is considered an electric drive system of the powertrain 10. The first and second drive systems generate torque to drive one or more sets of vehicle drive wheels 28 of the vehicle 12.

The engine 14, which is an internal combustion engine (ICE) in this embodiment, receives fuel, such as gasoline, from a fuel tank 16. Depending on the type of vehicle, fuels other than gasoline may be used. The engine 14 and the generator 18 may be connected through a power transfer unit 30, which in this example is a hybrid transmission gear system, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear, a sun gear, and a carrier assembly.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The power transfer unit 30 may be connected to a shaft 40, which is connected to vehicle drive wheels 28 through a second power transfer unit 44, which in this example is a drive gear system. The second power transfer unit 44 may include a gear set having a plurality of gears. Other power transfer units may also be suitable. The second power transfer unit 44 transfers torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery 24.

The battery 24 is one exemplary type of an electrified vehicle battery assembly and may take the form of a high voltage battery that is capable of outputting electrical power to operate the motor 22 and/or the generator 18. Other types of energy storage devices and/or output devices can also be used to supply power within the vehicle 12.

The powertrain 10 may additionally include a control system 58 (or, "controller") for monitoring and/or controlling various aspects of the vehicle 12. For example, the control system 58 may communicate with the electric drive system, the power transfer units 30, 44, or other components to monitor the vehicle 12, control the vehicle 12, or both. In this example, the control system 58 is in communication with a brake pedal assembly 64, and is in communication with various sensors for determining the acceleration/deceleration of the vehicle 12, among other vehicle parameters.

The control system 58 includes electronics, software, or both, to perform the necessary control functions for operating the vehicle 12. In one non-limiting embodiment, the control system 58 is a combination vehicle system controller and powertrain control module (VSC/PCM). Although it is shown as a single hardware device, the control system 58 may include multiple controllers in the form of multiple hardware devices, or multiple software controllers within one or more hardware devices. A controller area network (CAN) 62 allows the control system 58 to communicate with the various component of the vehicle 12.

Figure 2:
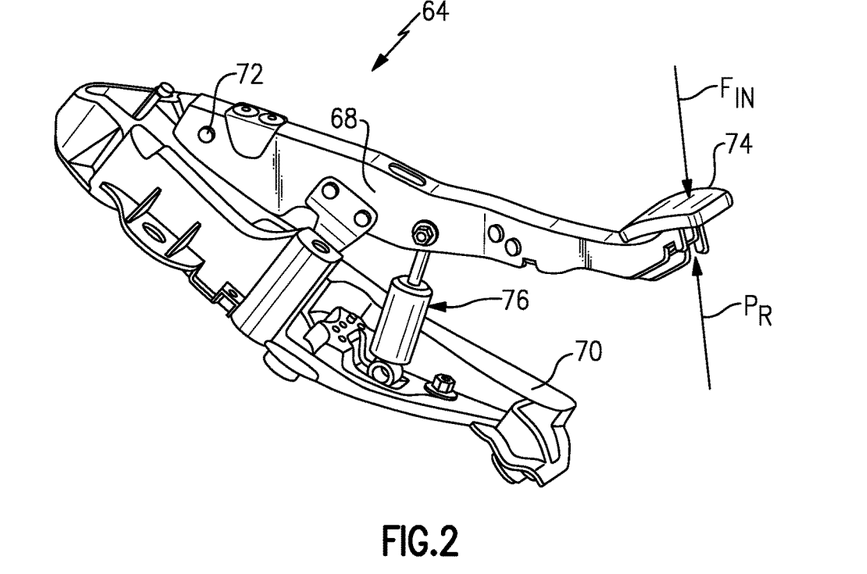
FIG. 2 illustrates an example brake pedal.

An example brake pedal assembly 64 is illustrated in FIG. 2. In this example, the brake pedal assembly 64 includes a pedal arm 68, which is pivotably connected to a pedal bracket 70 by way of a pivoting connection 72. The pedal bracket 70 may be connected to a vehicle body (not illustrated). At a free end of the pedal arm 68, the brake pedal assembly 64 includes a brake pedal 74. The brake pedal 74 is configured to pivot relative to the pedal bracket 70 in response to an input force F from a user. Near a midpoint of the pedal arm 68, a piston assembly 76 is connected between the pedal arm 68 and the pedal bracket 70. The piston assembly 76 resists a portion of the input force $F_{in}$, illustrated as a pedal resistance $P_R$, and provides a "pedal feel" to the user.

Figure 3:
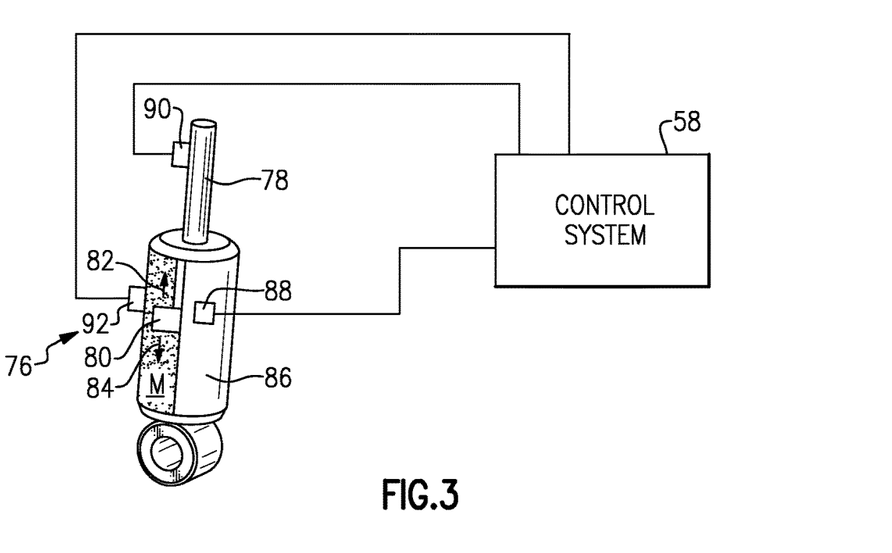
FIG. 3 illustrates a partial sectional view of the piston assembly from the brake pedal of FIG. 2.

FIG. 3 is a partially broken, schematic view of the piston assembly 76. As shown, the piston assembly 76 includes a shaft 78 connected to a piston 80. The piston 80 is moveable vertically upward and downward (upward and downward directions illustrated at 82, 84, respectively) within a housing 86.

In this example, the housing 86 is filled with a magneto-rheological fluid M. The control system 58 may be in communication with a magnetic field generator 88, which may be attached to the housing 86 or provided therein. The magnetic field generator 88 is operable to provide a varying magnetic field adjacent the magneto-rheological fluid M. In one example, the magnetic field generator 88 includes a plurality of electrical coils. The control system 58, in this example, is operable to vary the level of current applied to the electrical coils. As the magnetic field changes, the viscosity of the magneto-rheological fluid M changes, which in turn effects the pedal resistance $P_R$ and the level of "pedal feel" experienced by the user as he or she applies an input force $F_{in}$ to the brake pedal 74. In other words, changing the magnetic field influences the amount of pedal resistance $P_R$ offered by the piston 80 in response to an input force $F_{in}$.

The control system 58 may further communicate with a first sensor 90, which, in this example, is a linear sensor. The control system 58 uses information from the linear sensor 90 to monitor the linear movement of the shaft 78 and/or piston 80 relative to the housing 86. The information from the linear sensor 90 is used to monitor "pedal travel," which is the displacement of the brake pedal 74. The linear sensor 90 may monitor pedal travel in other ways, such as by monitoring angular movement of the brake pedal 74.

The control system 58 further communicates with a second sensor 92, which is a force or pressure sensor. The control system 58 uses information from the sensor 92 to determine a pressure of the magneto-rheological fluid, which corresponds to the input force $F_{in}$ at the brake pedal 74. Other methods of determining the input force $F_{in}$ come within the scope of this disclosure. The first and second sensors 90, 92 may be mounted at various locations relative to the brake pedal assembly 64, including being either inside or outside the housing 86.

FIGS. 4-9 illustrate various methods and aspects of this disclosure. The examples of FIGS. 4-9 apply to a vehicle 12 that includes the brake pedal assembly 64 (and the piston assembly 76).

Figures 4, 5A, 5B:
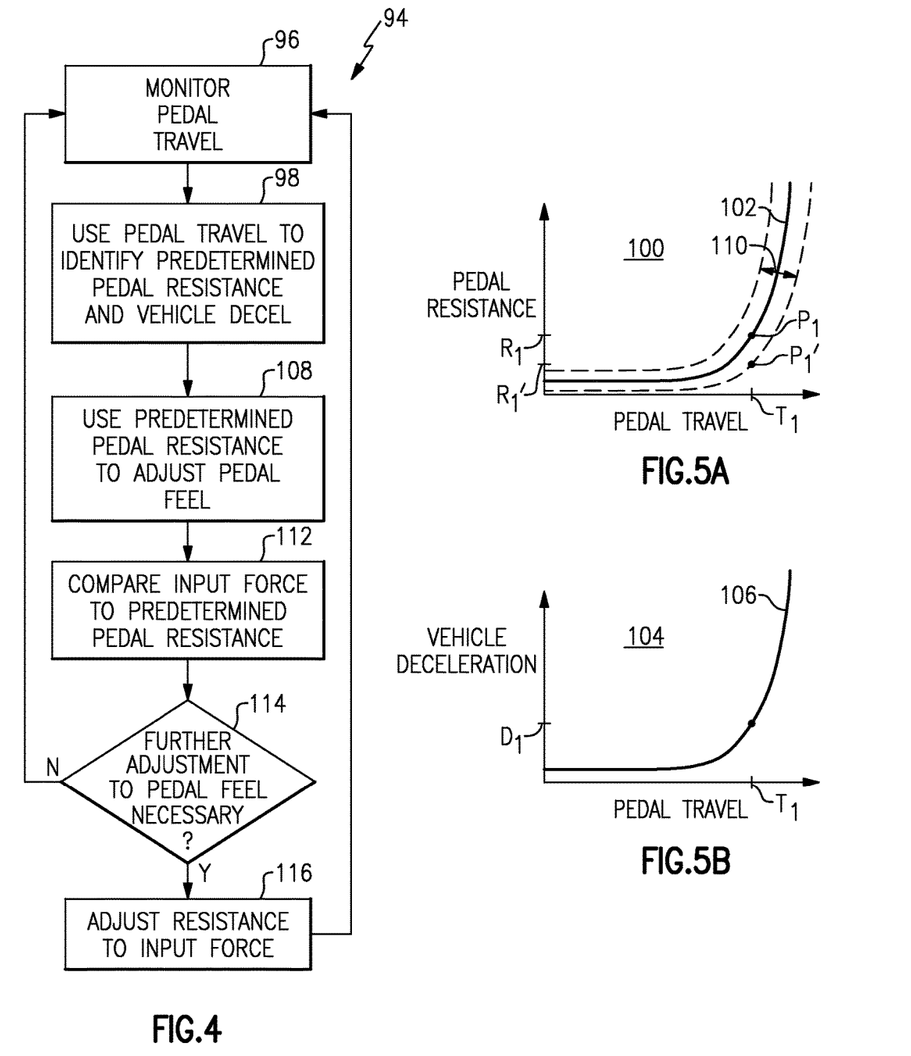
FIG. 4 illustrates an example method according to this disclosure.
FIG. 5A illustrates a pedal resistance map.
FIG. 5B illustrates a vehicle deceleration map.

FIG. 4 illustrates a first example method 94 according to this disclosure. In the method 94, the control system 58 continuously monitors the travel of the brake pedal 74 in real time (e.g., during operation of the vehicle 12), at 96. In one example, the pedal travel is monitored using the first, linear sensor 90.

At 98, the measured pedal travel is input into a map 100, which is illustrated in FIG. 5A, and a predetermined pedal resistance is identified. The map 100 includes a pedal resistance curve 102, which is used to relate an input of pedal travel to a particular level of pedal resistance. In one example, the pedal has traveled to a point $T_1$. According to the pedal resistance curve 102, point $T_1$ lies on the pedal resistance curve at $P_1$, and corresponds to a level of pedal resistance $R_1$.

FIG. 5B is another map 104 including a vehicle deceleration curve 106, which relates pedal travel to a particular level of vehicle deceleration. Continuing with the above example, for the same input pedal travel $T_1$, the curve 106 indicates that the vehicle 12 should decelerate at a level $D_1$. Vehicle deceleration may be accomplished using one or more of friction and regenerative braking. In one example, the curves 102, 106 are fixed and predetermined.

The maps 100, 104 are not required to literally be arranged as a map. While illustrated graphically, the maps 100, 104 may be stored on the control system 58 as charts or look-up tables (or as a single look-up table). Further, the maps 100, 104 are illustrated separately for purposes of explanation. The maps 100, 104 show that, in the method 94, a particular level of pedal travel relates to a particular vehicle deceleration, and, at that deceleration level, the user expects a particular level of pedal resistance to an input braking force (FIG. 2).

At 108, the control system 58 applies an appropriate magnetic field to the magneto-rheological fluid M using the magnetic field generator 88 to achieve the appropriate brake pedal feel, and to provide a pedal resistance $P_R$ at a level $R_1$, as identified at step 98.

Because of a number of possible factors, including the mechanical tolerances of the brake pedal assembly 64, the relationship between pedal travel and the actual pedal resistance $P_R$ experienced by the user may not be accurately reflected by the curve 102. In one example, as part of the brake pedal assembly qualification process, each particular brake pedal assembly 64 is tested to ensure that the pedal travel corresponds to an acceptable brake pedal resistance, which is relatively close to the curve 102. An acceptable correspondence band 110 is illustrated in FIG. 5A.

As one example, during braking, a particular brake pedal assembly 64 travels to the point $T_1$, but that brake pedal assembly 64 only provides a level of pedal resistance $R_{1'}$ to the user. This level of resistance $R_{1'}$ lies at point $P_{1'}$ on the map 100, which is within the correspondence band 110. Thus, the brake pedal assembly 64 is considered acceptable for use.

However, to increase consistency between vehicles, and to provide consistent levels of brake pedal feel, the control system 58 monitors the actual pedal resistance $P_R$ experienced by the user in real time, and compares that actual pedal resistance $P_R$ to the determined pedal resistance from the map 100, at 112. The control system 58 monitors the input force $F_{in}$, in one example, as an indicator of actual pedal resistance $P_R$, using the second sensor 92. In other examples, the pedal resistance $P_R$ is determined using force or pressure transducers.

If the actual pedal resistance $P_R$, as indicated by the input force $F_{in}$, deviates from the predetermined pedal resistance for a particular level of pedal travel, the control system, at 114, adjusts the magnetic field applied to the magneto-rheological fluid M to adjust the pedal feel at 116. For instance, in the example of FIG. 5A, the level of resistance to braking $R_{1'}$ is less than $R_1$, and thus the control system 58 would command an increase in the viscosity of the magneto-rheological fluid M.

Figure 6:
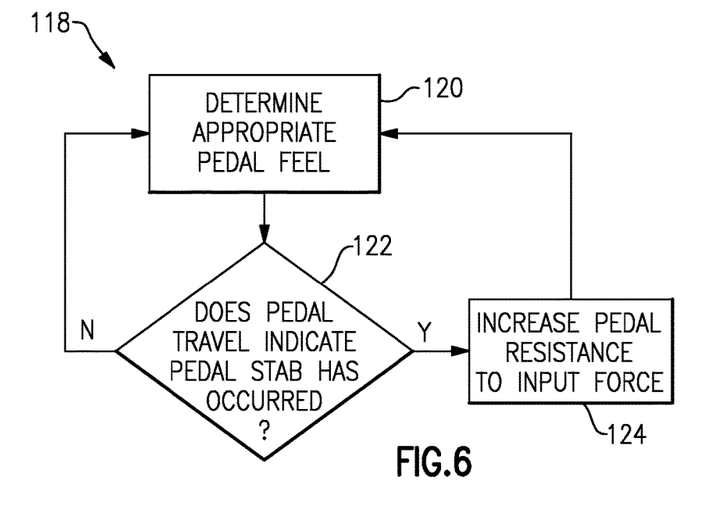
FIG. 6 illustrates a first example aspect of the method of FIG. 4.

With reference to FIGS. 6-9, this disclosure may be used in combination with the example method 94 to vary pedal feel in certain situations. FIG. 6 relates to a method 118 for adjusting pedal feel in a "pedal stab" condition. In FIG. 6, an appropriate level of pedal feel is determined, at 120, using the method 94, for example. A pedal stab is indicative of a panicked brake application during an emergency event, for example. During a pedal stab, a user inputs a large input force $F_{in}$ at the brake pedal 74 in an attempt to rapidly decelerate the vehicle 12.

During a pedal stab, the brake pedal quickly travels to a level indicative of a pedal stab (e.g., substantially to the right of point $T_1$ in FIG. 5A). If a pedal stab is detected, at 122, the viscosity of the magneto-rheological fluid M is increased, which in turn increases the pedal resistance $P_R$ to the input force $F_{in}$, at 124.

Increasing resistance during a pedal stab gives the user the feeling of a stiff brake pedal, which gives the user confidence in the brake pedal 74 during a time of rapid deceleration.

Figure 7:
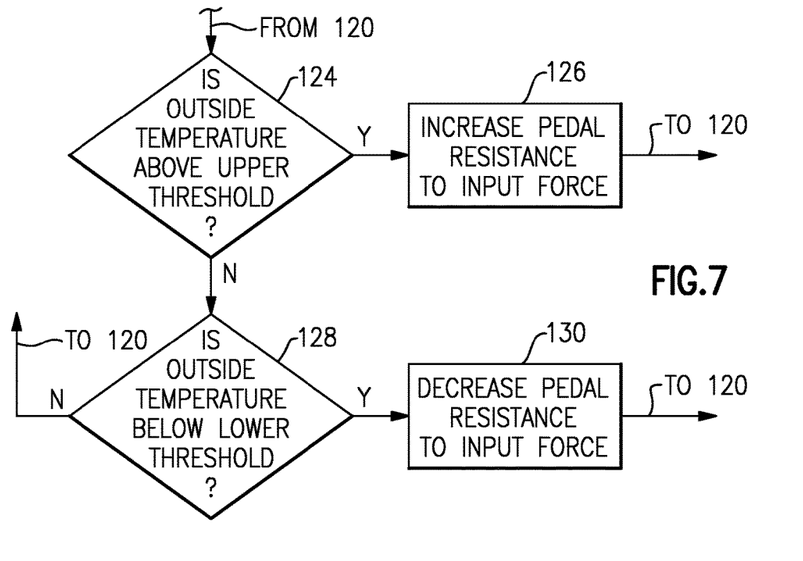
FIG. 7 illustrates a second example aspect of the method of FIG. 4.

The control system 58 may also be used to change the pedal feel associated with the brake pedal 74 based on the outside, external conditions (e.g., conditions outside the vehicle 12, which may also be referred to as "environmental" conditions) such as temperature, pressure, and/or humidity. In one example, which is illustrated in FIG. 7, if the outside temperature is above an upper threshold, at 124, the feel of the brake pedal 74 is adjusted such that the resistance felt by the user increases, at 126. Likewise, if the outside temperature is below a lower threshold, at 128, the resistance is decreased, at 130. This aspect of this disclosure increases the consistency of the pedal feel without regard to changing external conditions, which may affect the feel of the mechanical components in the brake pedal assembly 64. For the sake of illustrating a non-limiting example, when a user enters a relatively hot vehicle, the mechanical components essentially "soften," which could lead to a reduced mechanical resistance. In this example, the viscosity of the magneto-rheological fluid M would be adjusted to account for any reduced mechanical resistance of the components in the vehicle 12.

Figure 8:
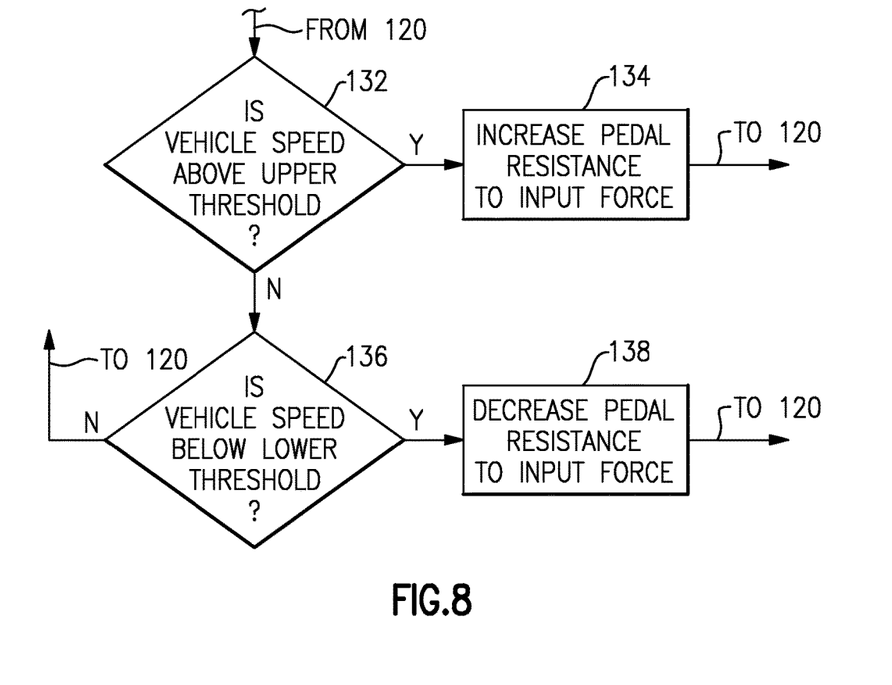
FIG. 8 illustrates a third example aspect of the method of FIG. 4.

As illustrated in FIG. 8, this disclosure may also be used to adjust pedal feel based on vehicle speed. As illustrated at 132, if the speed of the vehicle 12 is above an upper threshold, the resistance of the brake pedal 74 to the input force F can be increased, at 134. Likewise, at 136, if the vehicle speed is below a lower threshold, the resistance can be decreased, at 138. As non-limiting example, if a user is traveling down an expressway at a relatively high speed, the user would expect a relatively stiff brake pedal during normal driving conditions. The stiff pedal prevents over braking, which would lead to an abrupt stop. On the other hand, if the user is maneuvering at relatively low speeds, such as in a parking lot, the user would not expect a stiff brake pedal during normal driving conditions (unless a "pedal stab" occurred while driving at a low speed).

While FIGS. 7 and 8 reference upper and lower "thresholds," there may be more than one "threshold." For instance, a first upper threshold could correspond to a relatively stiff pedal, while a second upper threshold could correspond to an even stiffer pedal, and so on. Alternatively, the resistance of the brake pedal $P_R$ to the input force $F_{in}$ could be infinitely adjustable based on factors such as vehicle speed and outside temperature.

Figure 9:
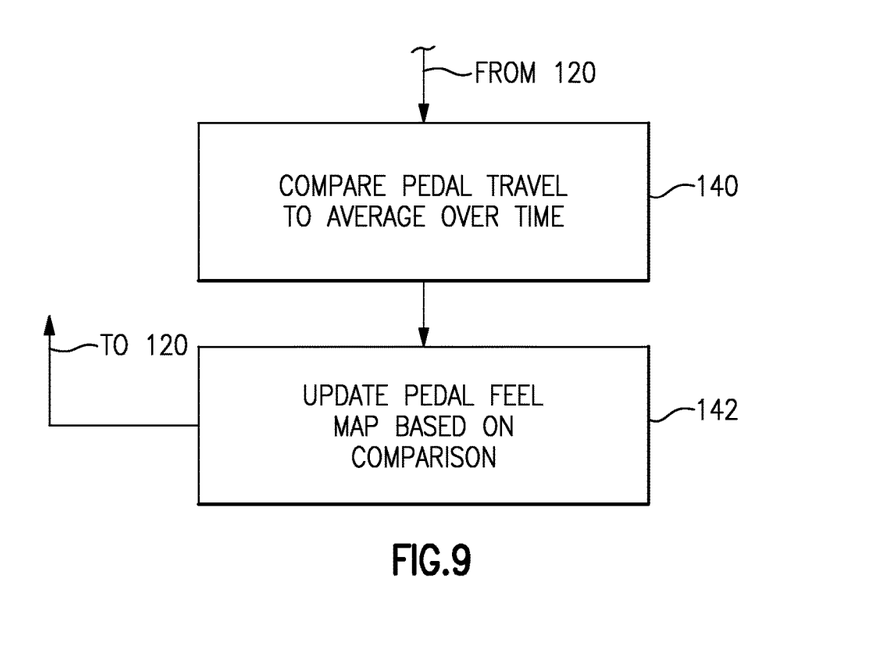
FIG. 9 illustrates a fourth example aspect of the method of FIG. 4.

With reference to FIG. 9, the pedal resistance map 100 of FIG. 5A can be adjusted over time (e.g., the curve 102 could be shifted to the right or to the left). At 140, the input force $F_{in}$ and deceleration of the vehicle 12 are compared over time to average input force/deceleration data combinations that have occurred during use of the vehicle 12. In another example, the comparison is made with respect to averages across a fleet of vehicles. At 142, if it is determined that a specific user prefers increased brake pedal resistance, as may be indicated by prolonged periods of relatively hard braking, the pedal feel map 100 may be updated to adjust the resistance of the brake pedal 74 to reflect the data that has been gathered over time.

Although different vehicle lines typically include different types of brake pedal assemblies, the brake pedal assembly 64 may be used between different vehicle lines. For instance, the same brake pedal assembly 64 could be installed in a Ford C-Max as is installed in a Ford Escape. While the C-Max is a traditional commuter driving vehicle, the Ford Escape is a sport utility vehicle. Users would typically expect a different pedal feel between vehicles like the C-Max and the Escape, which would typically require different brake pedal feel assemblies. However, the brake pedal assembly 64 of this disclosure could be provided in both vehicles. In that instance, while the hardware is constant between the two vehicles (e.g., same brake pedal assembly), the associated control system 58 could be updated to provide different levels of pedal feel.

The same concept applies to different vehicle models within a single vehicle line. For instance, a Ford Fusion SE could include the same brake assembly as the Ford Fusion Titanium. However, the software in different vehicle lines could be adjusted to provide different brake pedal feel maps, which in turn provides different pedal feels. Use of a single type of brake pedal assembly between vehicle lines and models reduces the need to provide vehicle-specific components, which in turn increases the ease of assembly and reduces overall costs.

Additionally, in another aspect of this disclosure, a user could adjust the brake pedal feel during driving. For instance, the user could select between options such as "sport" feel and "normal" feel. This would give the user the ability to adjust the pedal feel depending on a particular driving situation or simply based on user preference.

Terms such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A method, comprising:
adjusting the feel of a brake pedal if a measured input braking force deviates from a predetermined pedal resistance for a particular level of brake pedal travel, wherein adjusting the feel of the brake pedal includes adjusting the viscosity of a fluid resisting pedal movement.

2. The method as recited in claim 1, wherein:
a piston assembly including a magneto-rheological fluid is connected to the brake pedal;
a magnetic field generator is adjacent the piston assembly; and
the feel of the brake pedal is adjusted by changing the level of current applied to the magnetic field generator to adjust the viscosity of the magneto-rheological fluid.

3. The method as recited in claim 1, wherein the feel of the brake pedal is adjusted in response to a pedal stab.

4. The method as recited in claim 3, wherein, when a pedal stab occurs, the resistance of the brake pedal to the input braking force is increased.

5. The method as recited in claim 1, wherein the feel of the brake pedal is adjusted in response to an environmental condition.

6. The method as recited in claim 1, wherein the feel of the brake pedal is adjusted in response to a speed of a vehicle.

7. The method as recited in claim 1, wherein the brake pedal is associated with an electrified vehicle.

8. The method as recited in claim 1, wherein the feel of the brake pedal is always adjusted when there is any deviation in the measured input braking force from the predetermined pedal resistance for a particular level of brake pedal travel.

9. The method as recited in claim 1, wherein the predetermined pedal resistance is different for different levels of brake pedal travel.

10. A system, comprising:
a brake pedal assembly including a brake pedal;
a piston assembly connected to the brake pedal, the piston assembly including a fluid; and
a controller configured to adjust a viscosity of the fluid to adjust a feel of the brake pedal, wherein the adjustment to the feel of the brake pedal occurs if a measured input braking force deviates from a predetermined pedal resistance for a particular level of brake pedal travel.

11. The system as recited in claim 10, wherein the brake pedal assembly includes a brake pedal arm pivotably connected to a body of a vehicle, wherein the brake pedal is provided on a free end of the brake pedal arm.

12. The system as recited in claim 10, wherein the piston assembly is provided between a midpoint of the pedal arm and a body of a vehicle.

13. The system as recited in claim 12, wherein the piston assembly includes a housing containing a piston, and wherein the housing is filled with a magneto-rheological fluid.

14. The system as recited in claim 10, wherein the controller adjusts the feel of the brake pedal in response to a pedal stab.

15. The system as recited in claim 10, wherein the controller adjusts the feel of the brake pedal in response to a speed of a vehicle.

16. The system as recited in claim 10, wherein the controller adjusts the feel of the brake pedal in response to an outside temperature.

17. A system, comprising:
   a brake pedal assembly including a brake pedal;
   a controller configured to adjust a feel of the brake pedal if a measured input braking force deviates from a predetermined pedal resistance for a particular level of brake pedal travel; and
   a piston assembly provided between a midpoint of the pedal arm and a body of a vehicle, wherein the piston assembly includes a housing containing a piston, and wherein the housing is filled with a magneto-rheological fluid;
   wherein the brake pedal assembly includes a magnetic field generator in communication with the controller, the controller configured to adjust the magnetic field generated by the magnetic field generator to adjust the viscosity of the magneto-rheological fluid.

18. A system, comprising:
   a magnetic field generator;
   a brake pedal, wherein movement of the pedal is resisted by a magneto-rheological fluid; and
   a controller configured to adjust a feel of the pedal if a measured input braking force deviates from a predetermined pedal resistance for a particular level of brake pedal travel, the controller configured to adjust the magnetic field generated by the magnetic field generator to adjust the viscosity of the magneto-rheological fluid.

19. The system as recited in claim 18, further comprising a piston assembly including a housing filled with the magneto-rheological fluid and containing a piston.

20. The system as recited in claim 19, wherein the piston assembly is provided between a midpoint of an arm of the pedal and a body of a vehicle.

* * * * *

UNITED STATES PATENT AND TRADEMARK OFFICE
CERTIFICATE OF CORRECTION

PATENT NO. : 9,561,786 B2  
APPLICATION NO. : 14/514591  
DATED : February 7, 2017  
INVENTOR(S) : Shand et al.

Page 1 of 1

It is certified that error appears in the above-identified patent and that said Letters Patent is hereby corrected as shown below:

In the Claims

In Claim 17, Column 9, Line 20; delete "the" and replace with --a--

Signed and Sealed this  
Fourth Day of April, 2017

Michelle K. Lee  
*Director of the United States Patent and Trademark Office*